US012764477B2

(12) United States Patent
Wagner et al.

(10) Patent No.: US 12,764,477 B2
(45) Date of Patent: Oct. 13, 2026

(54) REAL-TIME BINAURAL AUDIO DETECTION AND ENHANCEMENT

(71) Applicant: Sound Furnace, Inc., Santa Monica, CA (US)

(72) Inventors: Damian Wagner, Santa Monica, CA (US); Ryan McGee, Marina Del Rey, CA (US)

(73) Assignee: Aster Dynamics LLC, Dover, DE (US)

( * ) Notice: Subject to any disclaimer, the term of this patent is extended or adjusted under 35 U.S.C. 154(b) by 591 days.

(21) Appl. No.: 18/199,672

(22) Filed: May 19, 2023

(65) Prior Publication Data

US 2023/0379638 A1 Nov. 23, 2023

Related U.S. Application Data

(60) Provisional application No. 63/343,774, filed on May 19, 2022.

(51) Int. Cl.
*H04R 25/00* (2006.01)
*G06F 3/00* (2006.01)
(Continued)

(52) U.S. Cl.
CPC ............. *H04R 25/505* (2013.01); *G06F 3/00* (2013.01); *H04S 7/00* (2013.01); *H04L 27/00* (2013.01); *H04S 1/00* (2013.01)

(58) Field of Classification Search
CPC ........ H04R 25/505; H04R 5/04; A61M 21/02; A61M 2021/0027; A61B 5/375;
(Continued)

(56) References Cited

U.S. PATENT DOCUMENTS 5,227,741 A * 7/1993 Marchetto ............... H04L 27/12
375/334
5,280,636 A * 1/1994 Kelley ..................... H04B 1/66
455/190.1

(Continued)

FOREIGN PATENT DOCUMENTS

CN 111462784 7/2020
CN 111916115 11/2020

(Continued)

OTHER PUBLICATIONS

International Search Report and Written Opinion, for corresponding PCT/US2023/022930, mailed Feb. 1, 2024, 13 pages.

*Primary Examiner* — Gerald Gauthier
(74) *Attorney, Agent, or Firm* — Christensen, Fonder, Dardi & Busse PLLC; John P. Fonder

(57) ABSTRACT

The present disclosure relates generally to binaural audio detection and enhancement. In one or more embodiments, a binaural audio system is provided having a digital signal processor configured to receive a first digital audio signal from an audio signal source, determine an audio frequency spectrum including two or more signal frequencies based on the digital audio signal, determine a first binaural frequency pair including two signal frequencies in the audio frequency spectrum having a first frequency difference in the range of 1 Hz to 100 Hz and generate a first binaural audio signal by modulating the first binaural frequency pair to increase a gain for the two signal frequencies of the first binaural frequency pair. In various embodiments the digital signal processor is further configured to output a second audio signal corresponding to the first digital audio signal and including the first binaural audio signal.

20 Claims, 8 Drawing Sheets

(51) Int. Cl.
*H04S 7/00* (2006.01)
*H04L 27/00* (2006.01)
*H04S 1/00* (2006.01)

(58) Field of Classification Search
CPC ....... G06F 3/00; G10L 21/0208; H04L 27/00; H04L 27/12; H04B 1/66; H04H 20/67; H04N 7/106; H04S 1/00; H04S 3/00; H04S 7/00; H04S 7/307; H04W 48/08; H04W 52/0274
See application file for complete search history.

(56) References Cited

U.S. PATENT DOCUMENTS

| | | | | | |
|---|---|---|---|---|---|
| 5,638,452 | A * | 6/1997 | Waller, Jr. | H04S 3/00 381/22 |
| 9,640,187 | B2 * | 5/2017 | Niemisto | G10L 21/0208 |
| 2011/0117852 | A1 * | 5/2011 | Copeland | H04W 48/08 455/62 |
| 2013/0202119 | A1 * | 8/2013 | Thiede | H04R 25/552 381/23.1 |
| 2014/0050340 | A1 * | 2/2014 | Meyer | H04R 25/353 381/321 |
| 2017/0127210 | A1 * | 5/2017 | Nakano | H04R 5/04 |
| 2017/0173296 | A1 * | 6/2017 | Park | A61B 5/4836 |
| 2021/0046276 | A1 * | 2/2021 | Papania | A61B 5/375 |
| 2021/0289573 | A1 * | 9/2021 | Greene | H04N 7/106 |
| 2021/0314870 | A1 * | 10/2021 | Hoversten | H04W 52/0274 |
| 2021/0385752 | A1 * | 12/2021 | Hoversten | H04L 27/34 |
| 2023/0300532 | A1 * | 9/2023 | Spittle | G06F 3/165 381/1 |
| 2023/0379638 | A1 * | 11/2023 | Wagner | A61M 21/02 |

FOREIGN PATENT DOCUMENTS

| | | |
|---|---|---|
| WO | WO2020220140 | 11/2020 |
| WO | WO 2021/108460 A1 | 6/2021 |
| WO | WO2023225315 | 11/2023 |

* cited by examiner

REAL-TIME BINAURAL AUDIO DETECTION AND ENHANCEMENT

RELATED APPLICATIONS

This application claims priority to U.S. Provisional Application 63/343,774, filed May 19, 2022, which is incorporated by reference herein in its entirety.

FIELD OF THE DISCLOSURE

The present disclosure relates to audio signal processing, and more specifically, to real-time binaural audio detection and enhancement in audio signals.

BACKGROUND

Auditory beat stimulation (ABS), including stimulation via the application of monaural-beat frequencies and binaural-beat frequencies, has been of interest for a wide array of applications, ranging from investigating the auditory steady-state response (ASSR) and measuring audiometric parameters in the brain, to understanding mechanisms of sound localization. In addition, studies have been conducted which suggest that ABS can be used to modulate cognition, to reduce anxiety levels, improve sleep, as well as to enhance or induce mood states. Other clinical targets have included treatment of traumatic brain injury and attention-deficit hyperactivity disorder.

Monaural and binaural beat frequencies are generated when sine waves with a small interaural frequency difference and with relatively stable amplitudes are presented to both ears simultaneously or to each ear separately. A monaural beat is perceived when the combination of two sine waves at neighboring frequencies are summated and presented to each ear at the same time resulting in an amplitude modulated signal. A binaural beat is perceived when two sine waves of neighboring frequencies are presented to each ear separately.

The small interaural frequency difference in each ear elicits various perceptions resulting from neural interactions in the central auditory pathway. The result is the perception of a single illusory tone with a frequency equal to the mean frequency of the two tones and an amplitude that fluctuates with a frequency that equals to the difference between the two tones. For example, a two-tone exposure of 400 Hz and 410 Hz to each ear separately will be perceived as a single tone with a frequency of 405 Hz that varies in amplitude with a frequency of 10 Hz. In contrast, if the interaural frequency difference is zero, a single tone is heard. If the IFD is sufficiently large, two discrete tones are heard.

Monaural and binaural beat frequencies are said to affect the brain function via stimulation of the superior olivary complex which functions to synchronize various activities of neurons. When exposed to ABS, the superior olivary complex responds by matching the frequency of the perceived beat. This is called the frequency-following effect. This effect in turn is said to influence the strength of certain brain waves, to alter different brain functions that control thinking and feeling that are associated with a particular brain wave.

For example, Delta brain waves, having a frequency range from 1-4 Hz, are associated with brain functions and feelings such as sleep, pain relief, cortisol reduction, and dehydroepiandrosterone production. Theta brain waves, having a frequency range from 4-8 Hz, are associated with brain functions and feelings such as creativity, meditation, and relaxation. Alpha brain waves, having a frequency range from 8-14 Hz, are associated with brain functions and feelings such as stress reduction, focus, and positive thinking. Beta brain waves, having a frequency range from 14-30 Hz, are associated with brain functions and feelings such as analytical thinking, energy, and high-level cognition. Gamma brain waves, having a frequency range from 30-100 Hz, are associated with brain functions and feelings such as attention to detail, cognitive enhancement, and memory recall.

SUMMARY

According to embodiments of the present disclosure, systems, methods, and computer program product for binaural audio detection and enhancement is disclosed. Specifically, Various embodiments of the disclosure are directed to a system for binaural audio detection and enhancement. The system leverages real-time enhancement of audio signals, such as music, to accentuate binaural frequencies. The emphasized binaural frequencies can correspond to one or more types of human brain waves, such as Delta, Theta, Alpha, Beta, and Gamma waves, potentially impacting brain wave activity and providing benefits associated with those brain waves in a manner desired by the user. The system, according to one or more embodiments, is designed to analyze an input audio signal to identify a binaural frequency pair. This pair comprises two or more frequencies with a difference in the range of 1 Hz to 100 Hz. The binaural frequency pair can correspond to specific brainwave frequencies, enabling the system to influence particular brain wave activities. User input may determine the type of brainwave frequency that the binaural frequency pair corresponds to, enabling real-time adjustments. Thus, the system can autonomously detect and emphasize frequency pairs that produce the user-desired brainwave effect.

In various embodiments the system enhances binaural frequencies by modulating filter and/or oscillator gain for the binaural frequency pair, thereby increasing the gain of the frequency pair. The system further maintains the user's preferred binaural frequency in the output by selectively emphasizing and subsequently de-emphasizing previously emphasized frequency pairs based on a set of binaural thresholds. This continual adjustment allows for simultaneous emphasis on multiple binaural frequencies within the audio signal. For instance, certain embodiments can generate a 10-voice polyphony, affecting Delta, Theta, Alpha, Beta, and Gamma waves simultaneously with five binaural frequency pairs. Various embodiments can generate any number of desired binaural frequencies, including a plurality of binaural tones each corresponding to the same or different brain wave. In various embodiments, the gain increases are controlled to such an extent that the emphasized binaural frequencies are perceptible but not directly audible to the human ear. This results in the unconscious perception of these frequencies without producing an audible binaural "beat" with fluctuating amplitude. Because the enhanced binaural frequencies are already present in the audio signal, the system is audio agnostic, capable of working with diverse types of audio signals without the need for artificial insertion of binaural frequencies. The binaural audio system, in one or more embodiments, comprises an audio signal source and a digital signal processor. This processor includes a logic device and memory housing computer executable instructions for binaural audio detection and enhancement. These instructions direct the processor to receive a digital audio signal, determine its audio frequency spectrum, and identify a first binaural frequency pair within this spectrum.

The instructions also facilitate the generation of a binaural audio signal by modulating the first binaural frequency pair to increase its gain. The resulting second audio signal incorporates the first binaural audio signal.

Further embodiments refine this process by utilizing two or more digital band-pass filters, each with a high Q-factor, to determine the audio frequency spectrum. The digital signal processor can also increase signal gain by escalating the filter gain of the signal frequencies by 1-3 dB. In various embodiments the two signal frequencies of the binaural frequency pair each have a frequency less than 1000 Hz. In one or more embodiments the audio frequency spectrum can be determined via a Fourier transform, and the second audio signal can be generated via Fourier transform synthesis. The system can also identify a second binaural frequency pair in the audio frequency spectrum and adjust the gain of the signal frequencies in this pair. This creates a second binaural audio signal, incorporated into the second audio signal output. In various embodiments increasing or attenuating signal gain includes increasing or attenuating filter gain of the signal frequencies according to the relative magnitudes of those frequencies in the source signal.

Various embodiments utilize a high Q Peak filter approach, with automatic carrier frequency determination and envelope following per voice that modulates the gain of the high Q filters. These advancements allow the system to heighten the Q factor (reduce bandwidth, steepen the slope) of the filters, averting long decay and preventing resonator feedback. N carrier frequencies are ascertained (five in the current system, but expandable to infinite) by scrutinizing all peaks in the 40-3300 Hz range of the source spectrum. In this process, a Fletcher Munson equal loudness curve is applied before magnitude analysis of each bin. This adjustment ensures that peaks correspond to perceptual loudness rather than digital magnitudes, which are typically much lower for high frequencies that are perceived as louder than lower frequencies of the same magnitudes. For each FFT bin, a variable time average (ranging from 50-1000 ms depending on the genre of the source audio) is calculated. The results of this average are then processed through an audio meter-style smoothing filter, facilitating fast attack for increasing magnitudes and slow decay for decreasing ones. The process concludes with the identification of peaks using an instantaneous threshold, which corresponds to the average magnitude of all averaged and smoothed FFT bins within the 40-3300 Hz range. At the end of each FFT frame update, the top N magnitude peaks are selected and filtered such that the resulting N peaks are a minimum of 100 Hz apart from each other. Following the selection of N F1 Carrier values, the F2 Hz value is computed as F1 plus a user-set Offset Hz (based on the desired brainwave frequency range). The instantaneous F1 and F1 magnitudes extracted from the FFT are then used for swift-response modulation of F1 and F2 Resonator gains. As a result, the Carrier frequency selection tracks the source smoothly and stably, while the envelope followers at those frequencies modulate rapidly to create a vocoder-like effect. In essence, the system behaves akin to an N-band vocoder with dynamic band re-centering and extraordinarily narrow bands (approximated at ~1 Hz).

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
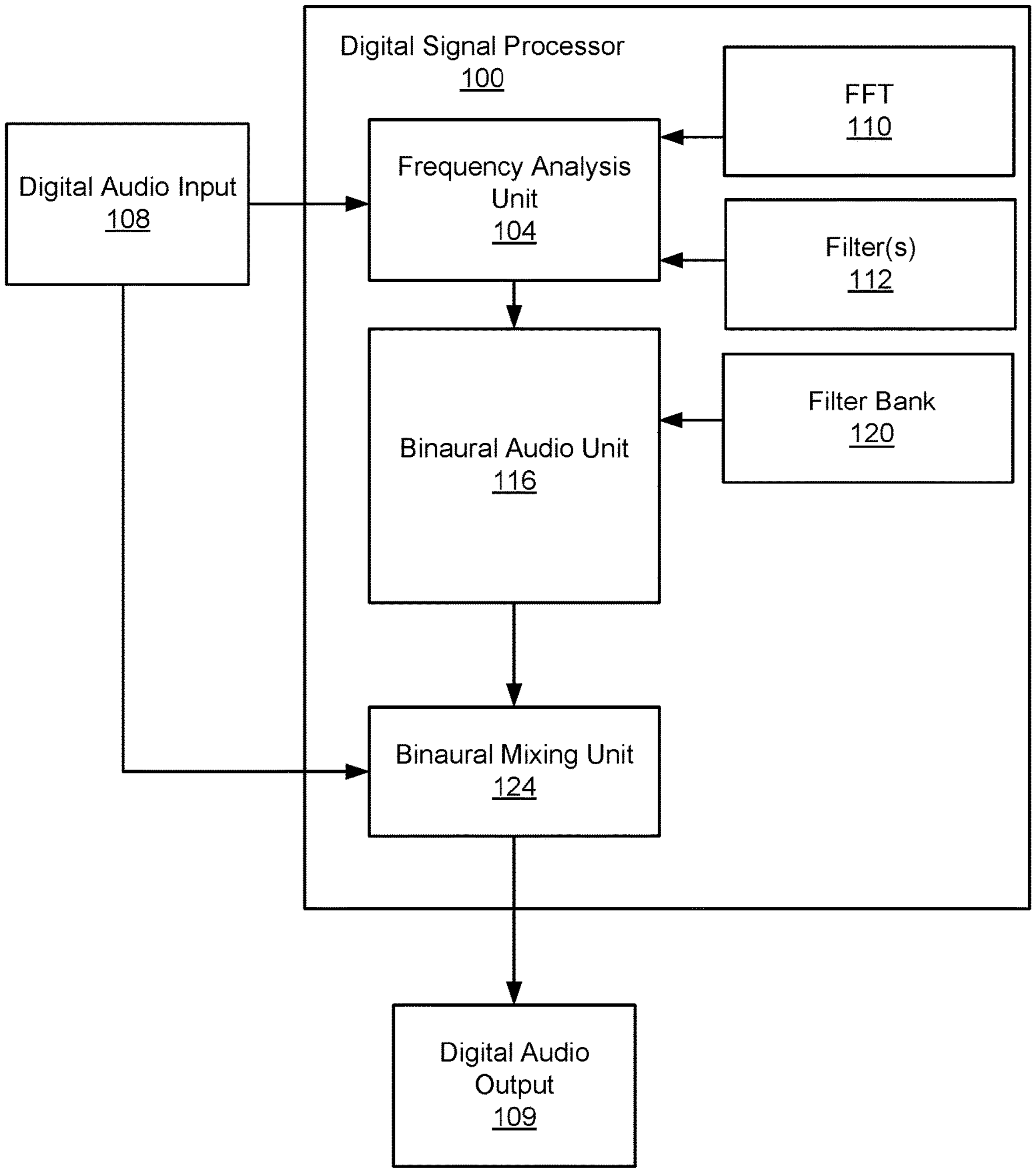
FIG. 1 depicts a block diagram of a digital signal processor, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the embodiments described. On the contrary, the intention is to cover all modifications, equivalents, and alternatives falling within the spirit and scope of the disclosure.

DETAILED DESCRIPTION

Referring to FIG. 1 a block diagram of a digital signal processor 100 is depicted, according to one or more embodiments of the disclosure. In one or more embodiments the digital signal processor 100 includes a frequency analysis unit 104 that is configured to receive a digital audio input 108 and analyze the audio waveform of the input 108 in real time. In certain embodiments the digital audio input 108 is a digital audio signal that corresponds to music. However, the audio input 108 could correspond to any type of digital audio, including stereo, mono, or other suitable format. In such embodiments, the signal processor 100 is configured to receive the digital audio signal, perform binaural enhancement as described herein, and produce a digital audio output 109 that corresponds to the audio input but includes the binaural enhancement.

In various embodiments, the frequency analysis unit 104 is coupled with one or more of an FFT unit 110 and a filter unit 112 for frequency analysis of the input 108. In one or more embodiments the frequency analysis unit 104 could divide the audio input 108 into an audio frequency spectrum including two or more signal frequencies. For example, the frequency analysis unit 104 could divide the audio input 108 into one or more frequency bands, including a 400 Hz frequency band and 410 Hz frequency band.

In various embodiments the digital audio input is transformed into frequency domain using the FFT unit 110 designed such that it is arranged to divide the input 108 into one or more frequency bands corresponding to a plurality of signal frequency components. In certain embodiments the digital audio input is transformed into a plurality of signal frequency components using the filter unit 112 which includes two or more band-pass filters, such as FIR/IIR filters. In one or more embodiments, the two or more digital band-pass filters each having a high Q-factor, the two or more band-pass filters each corresponding to a signal frequency in the plurality of signal frequencies. In one or more embodiments, the analyzed frequency bands are in a range of 20 Hz to 20 kHz. However, in various embodiments FFT 110 filters will preserve spatial imaging better than FIR/IIR time-domain.

In one or more embodiments the digital signal processor 100 includes a binaural audio unit 116. In various embodiments, the binaural audio unit 116 is configured to determine one or more binaural frequency pairs from the audio frequency spectrum. In various embodiments, the binaural frequency pairs are pairs of frequencies that have a frequency difference such that the resulting frequency pair results in a small interaural that corresponds to a brain wave frequency. For example, in various embodiments, a binaural frequency pair includes two signal frequencies in the audio frequency spectrum having a first frequency difference in the range of 1 Hz to 100 Hz. As a further example, the binaural audio unit 104 could select the 400 Hz frequency band and the 410 Hz frequency band, identified by the frequency analysis unit 104, as binaural frequency pairs because these frequency bands possess a frequency difference of 10 Hz.

In one or more embodiments, the binaural audio unit 116 is configured to generate a binaural audio signal from the binaural frequency pair by modulating the binaural frequency pair to increase a gain for the two signal frequencies of the first binaural frequency pair. As such, the binaural audio unit 116 is configured to increase the relative gain of the binaural frequency pair to emphasize or enhance a binaural signal naturally present in the audio input 108 relative to the other frequency bands in the audio input 108. In such embodiments the binaural audio unit 116 is coupled with a filter bank 120 configured for individual frequency and amplitude controls of input waveforms. In one or more embodiments, the audio unit 116 is configured to increase gain such that the binaural frequency pairs are emphasized but such that the resulting binaural signal is not noticeable or audible to a listener when resynthesized into the audio output 109. In various embodiments, the signal gain is increased by 1-3 dB. In certain embodiments the signal gain increases include increasing or attenuating filter gain of the signal frequencies based on the relative magnitudes of those frequencies in the source signal.

In one or more embodiments the digital signal processor 100 includes a binaural mixing unit 124. In such embodiments, the binaural mixing unit 124 is configured to sum the frequency bands of the audio input 108 and the binaural audio signal to generate the digital audio output 109. In various embodiments, this process is carried out by an inverse FFT process or resynthesis process. In certain embodiments, the resynthesis process or inverse FFT process can include various mixing or other processing steps are desired by the user. For example, in certain embodiments, an inverse FFT process or resynthesis process further includes various mixing with the audio input signal 108.

In one or more embodiments the digital signal processor 100 is a logical device, such as a processor, CPU, or the like, that can receive and execute computer instructions. In one or more embodiments, the digital signal processor 100 can be included within a physical device that is usable by a consumer or other user. For example, the processor 100 can be included in a desktop computer, laptop computer, tablet device, smart phones, wearable computing device, or other computing device. In various embodiments the digital signal processor 100 can be coupled with one or more other computing elements such as memory, other processing elements, I/O devices, networking adapters, and the like.

Figure 2:
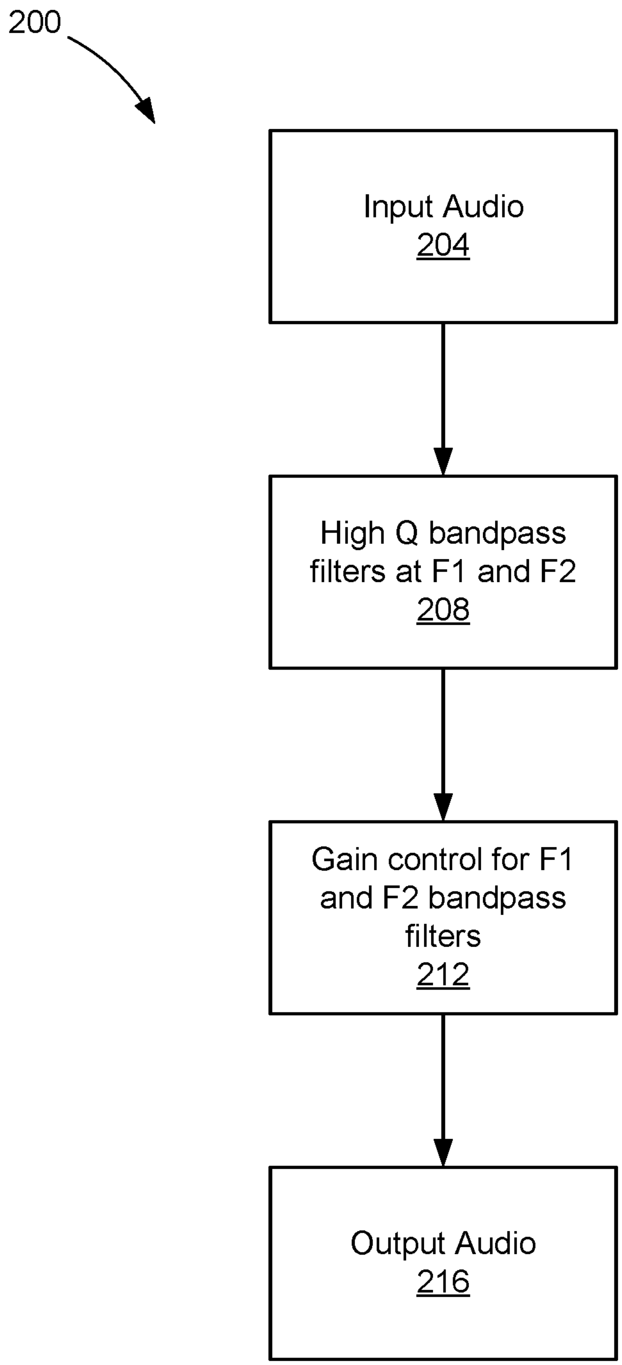
FIG. 2 depicts a method of binaural audio enhancement, according to one or more embodiments of the disclosure.

Referring to FIG. 2, a method 200 of binaural audio enhancement is depicted. In one or more embodiments the method includes, at operation 204, receiving a digital audio input. In one or more embodiments, at operation 208, the method includes determining a binaural frequency pair F1 and F2 using high Q peak filters. In various embodiments the high Q filters have an approximately 1 hz accuracy. In such embodiments the high Q peak filters analyze/identify a binaural frequency pair without the use of FFT. In various embodiments, at operation 212, the binaural frequency pair has gain control, to emphasize the F1 F2 frequency bands relative to other frequencies in the audio signal and generate a binaural signal. In various embodiments, at operation 216, the audio signal is output with the binaural frequency signal. In some embodiments the high Q peak filters analyze/identify a binaural frequency pair without the use of FFT. In various embodiments, at operation 212, the binaural frequency pair has gain control, to emphasize the F1 F2 frequency bands relative to other frequencies in the audio signal and generate a binaural signal. In various embodiments, at operation 216, the audio signal is output with the binaural frequency signal.

Figure 3:
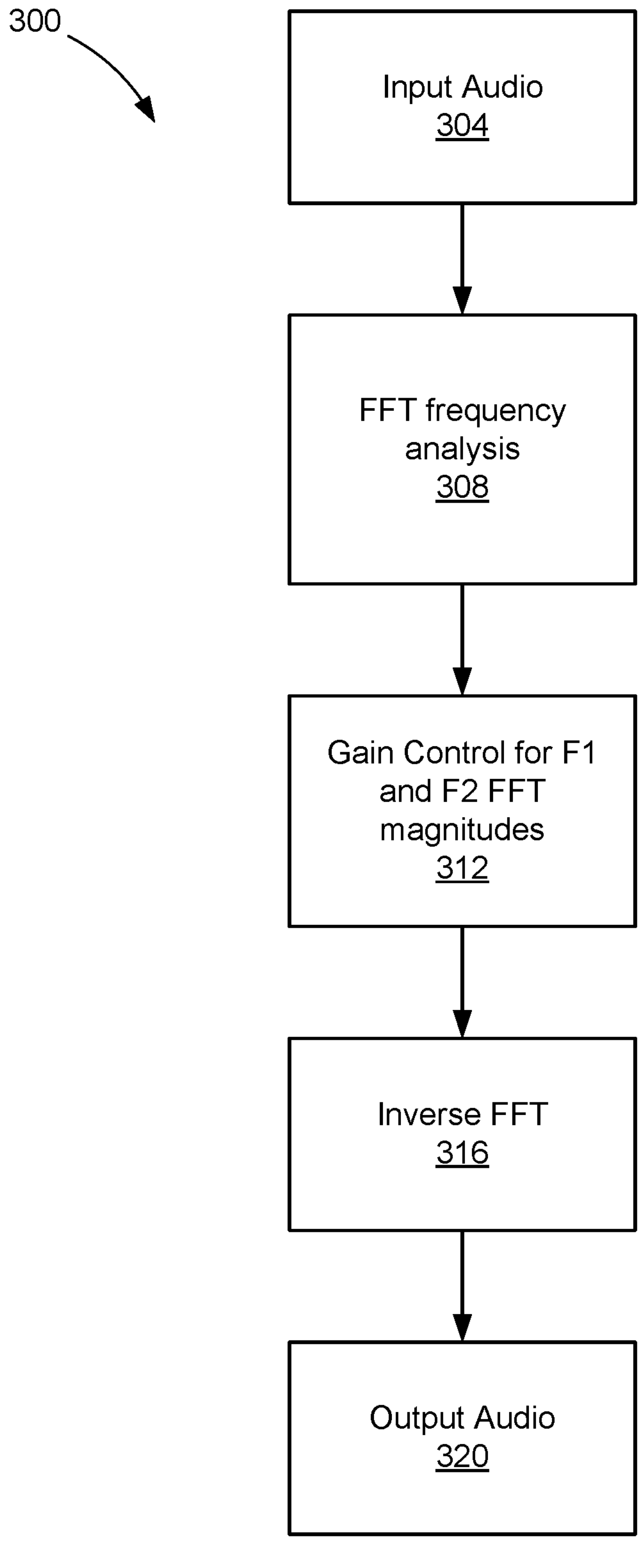
FIG. 3 depicts a method of binaural audio enhancement, according to one or more embodiments of the disclosure.

Turning to FIG. 3, the diagram illustrates a method 300 of binaural audio enhancement. In one or more embodiments, the method initiates with operation 304, wherein a digital audio input is received. In the subsequent operation 308, the method determines a binaural frequency pair F1 and F2, employing Fast Fourier Transform (FFT). The FFT, in various embodiments, segments the audio input into multiple frequency bands with an impressive precision of approximately 1 Hz, and a band spacing of 0.5-1 Hz. Continuing to operation 312, the binaural frequency pair undergoes gain control, which emphasizes the F1 F2 frequency bands relative to the other frequencies within the audio signal. This process generates a binaural signal. In various embodiments, this gain control is effectuated via a digital filter bank.

Simultaneously, operation 312 could involve determining a binaural frequency pair F1 and F2 using high Q peak filters. The system dynamics of these filters are informed by the peak gain threshold of the input audio in real-time. A minimum volume threshold ensures that less significant, quieter parts of the song are bypassed. In addition, an extremely narrow Q factor conserves processing power by limiting the processing to a small frequency range around the peak threshold. This optimization enhances the efficiency of the system, allowing real-time audio processing. The Q filters are regularly adjusted to maintain updated frequency values and to modify the Q filter parameters correspondingly. In such embodiments, the Q filter showcases a rapid response time, in the order of 1-10 milliseconds, which allows for swift updates to the audio output. This rapid response is enabled by a real-time peak detection algorithm that evaluates the audio input and adjusts the Q filter parameters in response to changes in peak amplitudes. The resulting system represents a real-time signal processing framework that selectively processes peaks of the input signal that surpass a specified volume threshold. The Q factor and frequency range around each peak are kept extremely narrow to minimize processing power while preserving accurate peak detection.

The dynamics of the filter bank system are guided by the peaks of averaged and smoothed magnitudes originating from a Discrete Fourier Transform (DFT) of the same input signal supplied to the filter bank. The input signal could be a stereo or mono music source, or any digitally recorded or streaming audio source. Upon obtaining the DFT magnitudes, the top P number of peaks are selected above a minimum magnitude threshold. This ensures that each peak is significantly greater than the average magnitude of all DFT bins. The corresponding frequencies for each DFT peak determine the center frequency for an identical number of resonators in the filter bank. The resonators constitute digital bi-quad filters characterized by an extremely high Q factor and 8× oversampling, aimed at reducing feedback and narrowing the filter bandwidth.

The ensuing equations represent a real-time signal processing system that selectively processes the most dominant peaks of the input signal that exceed the DFT magnitude threshold. The system maintains an extremely high Q factor to narrow the frequency range around each peak.

In one or more embodiments, the processing algorithm is represented by the equation:

$$y(t) = \sum i = 1 \text{ to } N[H(x(t)) * P(\varrho, z) * A(\varrho, z) * w(t)]$$

Where:

- y(t) is the output signal at time t;
- N is the number of peaks to be processed;
- H(x(t)) is a function that selects the peaks of the input signal x(t) that exceed a volume threshold Vth. This function selects the peaks of the input signal x(t) that exceed the volume threshold Vth. This is done to reduce the amount of noise and unwanted signals in the input signal.
- P(ϱ, z) and A(ϱ, z) are functions that determine the frequency response of the filters. P(ϱ, z): This function determines the frequency response of the resonator. It takes two parameters: ϱ, which is a positive constant that determines the resonance properties of the filter, and z, which is a complex frequency variable that determines the center frequency of the resonator. By adjusting these parameters, the frequency response of the resonator can be tuned to enhance or suppress certain frequencies. A(ϱ, z): This function is similar to P(ϱ, z), but it is used to adjust the amplitude of the resonator. This can be used to amplify or attenuate certain frequencies.
- w(t) is a Hann windowing function that selects a narrow frequency range around each peak with width Δf. This helps to isolate the frequencies of interest and reduce the effect of other frequencies.
- ϱ is a positive constant that determines the resonance properties of the filter.
- z is a complex frequency variable that determines the center frequency of the resonator.

By combining these terms, the equation processes the input signal in real-time and produces an output signal that has been enhanced at certain frequencies. This can be used to create binaural beat effects, where the difference in frequency between the left and right input channels creates a beat frequency that can entrain the brainwaves to a desired frequency range.

In one or more embodiments the calculation of Discrete Fourier Transform (DFT) magnitudes |Xk| are computed as follows:

$$|Xk| = g(n) * \sum n = 0 \text{ to } N - 1\, x(n) * e\hat{}(-2\pi i/N)kn;$$

Here, g(n) represents a discrete implementation of a Fletcher Munson curve to favor magnitudes as per perceptual loudness. N stands for a discrete time window of 10 milliseconds. An average magnitude spanning 0.01 to 1 seconds is calculated for each DFT bin, denoted as Yk. The computed magnitudes undergo processing through a first-order smoothing filter to enable gradual decay of magnitudes, symbolized as Zk. An instantaneous average magnitude for the entire spectrum (all bins), T, is derived from which a minimum threshold is established. The threshold ensures that only the top peaks that surpass this threshold are selected.

Yk=Σk=0 to M−1|Xk|/M, where M corresponds to an adjustable discrete time window ranging from 0.01 to 1 second.

Zk=(1.0−A)Yk(n)+AYk(n−1), where A is an adjustable smoothing coefficient.

$$T = \sum n = 0 \text{ to } N - 1\, Zk/N$$

The corresponding Hertz values for the top P number of DFT bins with filtered magnitudes, Zk, above the threshold T, are utilized to set the center frequency for a filter bank of second-order bi-quad resonators, which are executed as band-pass filters with an extraordinarily high Q value. The highest P peaks are also filtered such that they are at least B Hz apart and within an Hzmin to Hzmax range. B, Hzmin, and Hzmax can be adjusted as per requirement.

The center frequency or corner frequency, or shelf mid-point frequency, f0, depending on the filter type, is the "significant frequency". Fs refers to the sampling frequency. The Q value, ranging from 100-1000, is maintained to achieve an extremely narrow filter bandwidth. Further, we introduce a second filter bank of resonators with their center frequencies set to f1 to establish a tone pair consisting of f0 and f1, where f1=f0+λ. Here, λ signifies a manually adjustable Hertz offset to target brainwaves in the following ranges: Delta (0-3 Hz), Theta (3-8 Hz), Alpha (8-11 Hz), Beta (11-30 Hz), and Gamma (30-100 Hz). The output of the second filter bank is exclusively channeled to the right, while the first is directed to the left.

Figure 7:
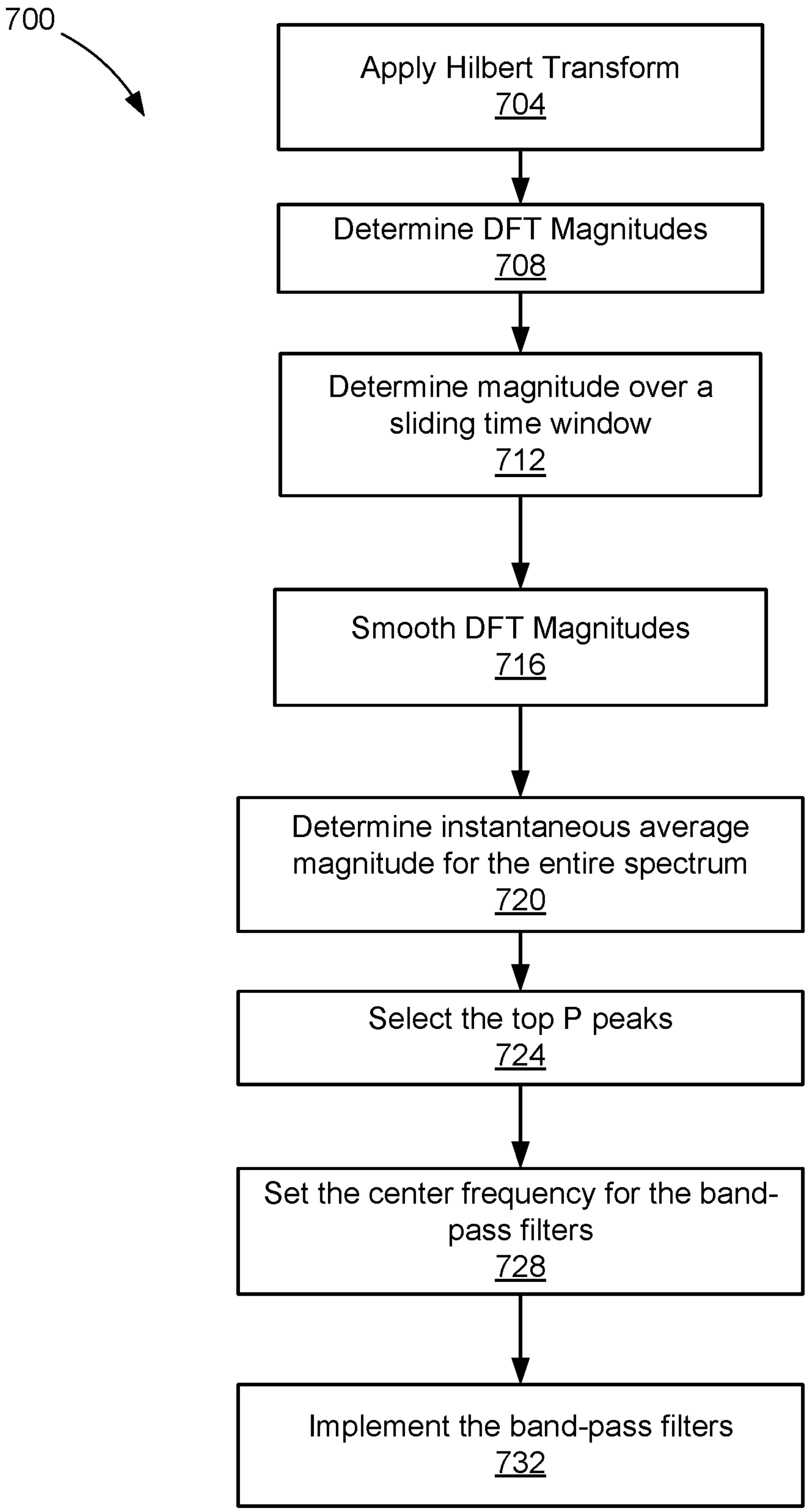
FIG. 7 depicts a method of frequency pair selection, according to one or more embodiments.

Referring to FIG. 7, a method 700 depicts an organized breakdown of the method according to one or more embodiments. The method 700 includes, at operation 704, applying the Hilbert transform and Hann window: x(n)=Ht(x(t)*w(t)) where w(t) denotes the Hann windowing function. The method 700 includes, at operation 708, determining the DFT magnitudes: X(k)=g(n)*Σn=0 to N−1 x(n)*e^(−2πi/N*k*n); where g(n) symbolizes a discrete implementation of the Fletcher-Munson curve and N is a discrete time window of 10 milliseconds. |X(k)| depicts the magnitude of frequency bin k. The method 700 includes at operation 712, determining the average magnitude over a sliding time window: Y(k)=Σk'=k to k+M−1|X(k')|/M; where M signifies an adjustable discrete time window. The method 700 includes at operation 716, smoothing the magnitudes: Z(k)=(1−A)*Y(k)+A*Y(k−1). Here, A symbolizes an adjustable smoothing coefficient. In one or more embodiments the method 700 includes at operation 720, determining the instantaneous average magnitude for the entire spectrum: T=Σk=0 to N−1 Z(k)/N. In this equation, N corresponds to the total number of frequency bins.

In one or more embodiments the method 700 includes, at operation 724 selecting the top P peaks: S={k|Z(k)>T, k is within Hzmin and Hzmax, and the distance to its closest neighbor in S is greater than B}. Here, Hzmin and Hzmax function as adjustable frequency limits, B signifies the minimum frequency distance between selected peaks, and |S|=P. In one or more embodiments the method 700 includes, at operation 728 setting the center frequency for the band-pass filters: fc(p)=k(p)*Fs/N. In this equation, k(p) stands for the frequency bin index for the p-th selected peak in S, and Fs refers to the sampling rate. In one or more embodiments the method 700 includes, at operation 732 implementing the band-pass filters: H(p)(z)=(B(p)/Q(p))*(z^(−2)+(1/Q(p))*z^(−1)+1)/(1+(1/Q(p))*z^(−1)+(B(p)/Q(p))*z^(−2)). Here, B(p) represents the bandwidth of the p-th filter, and Q(p) stands for the resonance (Q) factor of the filter. These equations systematically outline a signal processing method to effectively analyze audio signals and extract salient information. This method involves the application of diverse filters and transformations to the signal to isolate and amplify specific frequency components. Following that, these components are utilized to identify key features of the sound.

Referring again to FIG. 3, in various embodiments, at operation 316, the binaural signal is combined with the frequency bands via inverse FFT and at operation 320 the audio signal is output with the binaural frequency signal.

Figure 4:
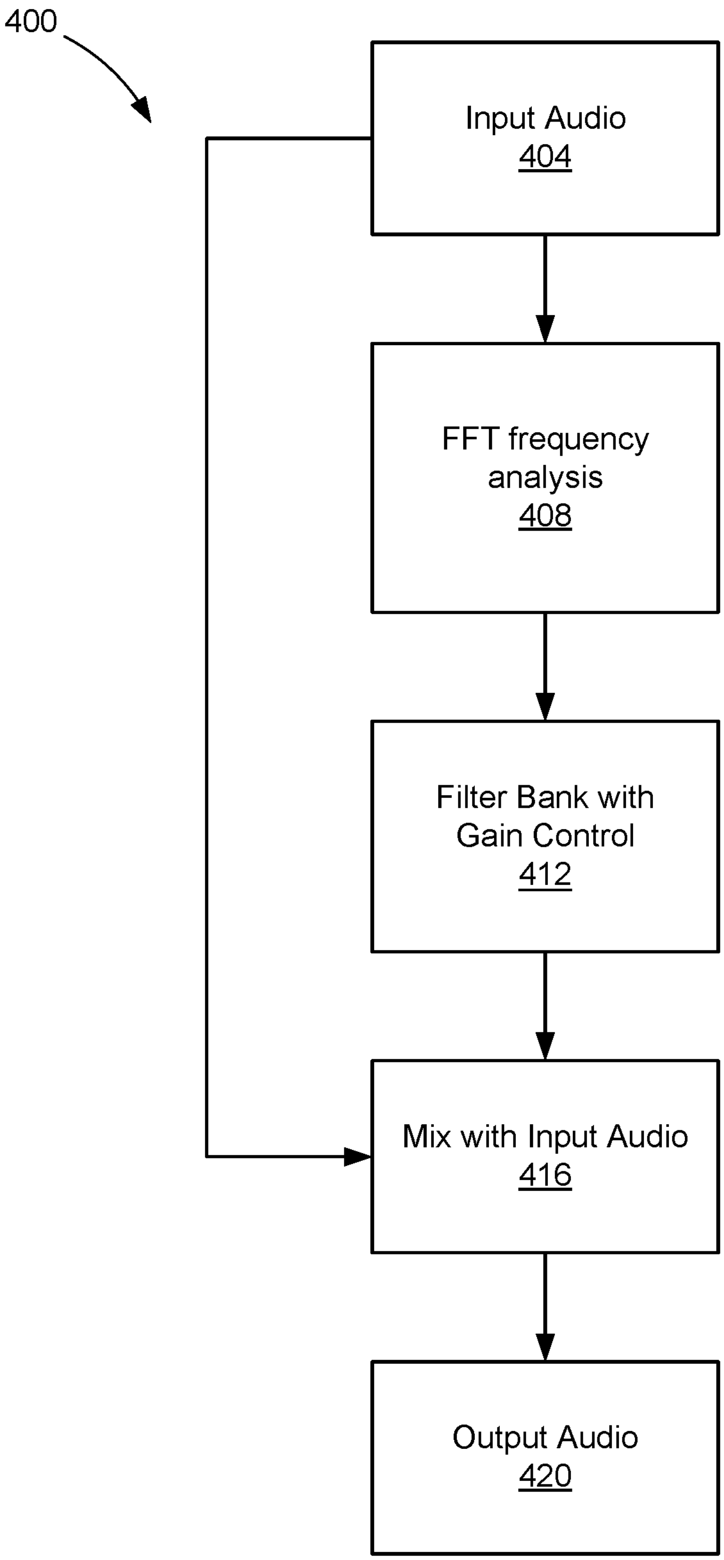
FIG. 4 depicts a method of binaural audio enhancement, according to one or more embodiments of the disclosure.

Referring to FIG. 4, a method 400 of binaural audio enhancement is depicted. In one or more embodiments the method includes, at operation 404, receiving a digital audio input. In one or more embodiments, at operation 408, the method includes determining a binaural frequency pair F1 and F2 using FFT. In various embodiments the FFT divides the audio input into one or more frequency bands with an approximately 1 Hz accuracy with 0.5-1 hz band spacing. In various embodiments, at operation 412, the binaural frequency pair has gain control, to emphasize the F1 F2 frequency bands relative to other frequencies in the audio signal and generate a binaural signal. As described above, in various embodiments gain control is achieved via a digital filter bank. In various embodiments, at operation 416 the binaural signal is combined with the frequency bands via inverse FFT. In one or more embodiments, the binaural signal is further mixed with the input audio and can in certain embodiments receive additional gain boost for binaural signal emphasis. At operation 420 the audio signal is outputted with the binaural frequency signal.

Figure 8:
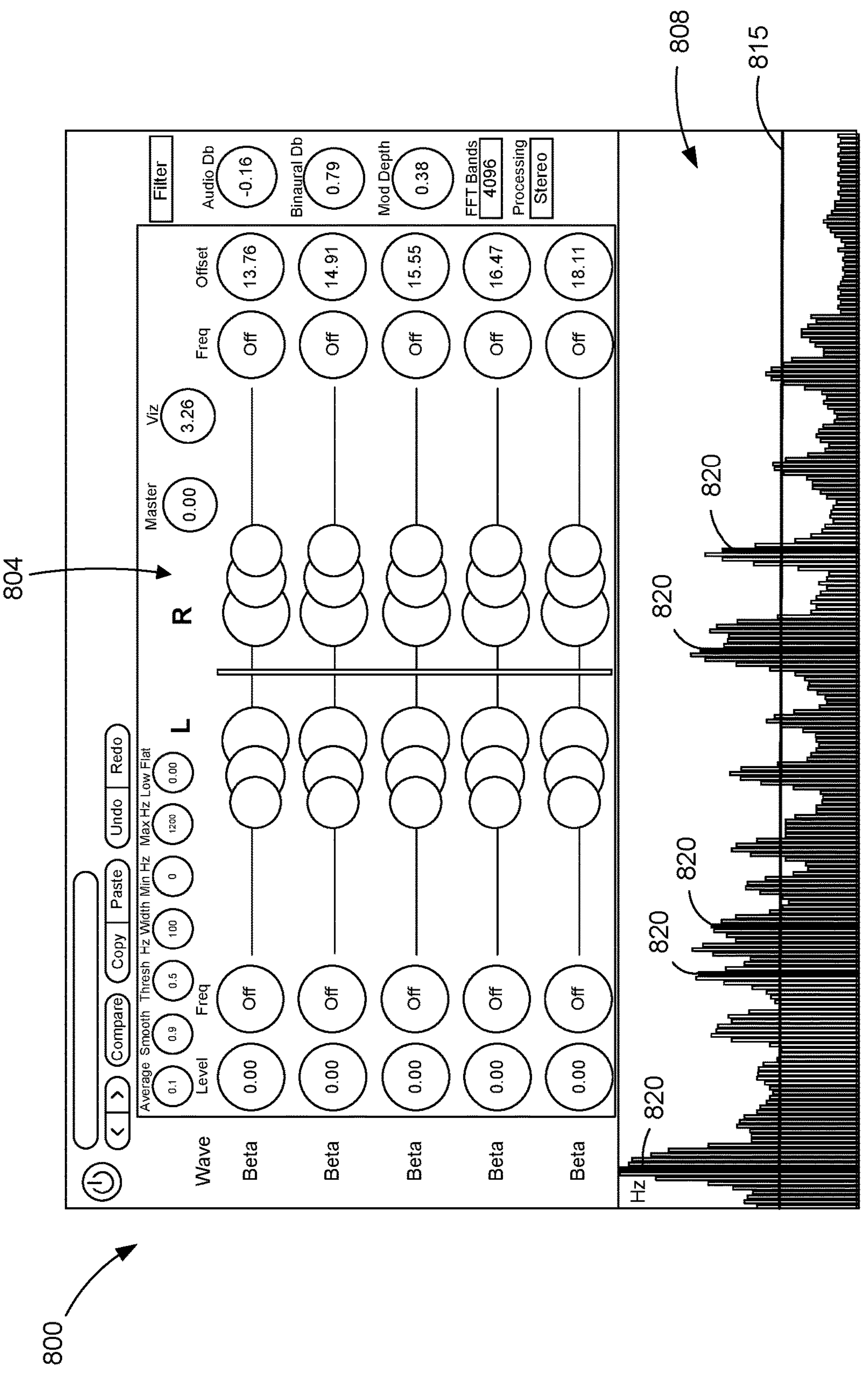
FIG. 8 depicts an example graphical user interface (GUI) component for a digital signal processor, according to one or more embodiments.

Referring now to FIG. 8, an exemplary graphical user interface (GUI) component 800 for the digital signal processor is depicted according to one or more embodiments. This GUI component includes a binaural control section 804 and a waveform display section 808, as per various embodiments. The binaural control section 804, in numerous embodiments, features a selection of settings and visual indicators to manage the binaural processing of the input audio. An illustrative example of this the binaural control section 808 includes a brainwave setting toggle. This allows users to choose the type of binaural frequency output the system should produce. As shown in FIG. 8, the user has opted for five distinct binaural frequency tones, all corresponding to Beta wave frequencies. However, it should be noted that various embodiments permit the selection of any type of brainwave, in any combination the user may desire. The GUI enables users to control the master volume, frequency, and the desired offset between the selected tones for each selected frequency. For instance, in this example, the user has chosen diverse offsets, including 13.76 Hz, 14.91 Hz, 15.55 Hz, 16.47 Hz, and 18.11 Hz. Additional settings, such as smoothing, volume threshold, FFT bandwidth, minimum Hz, maximum Hz, and more, can also be adjusted by the user for the FFT and binaural frequency pair selection in different embodiments.

The waveform section 808, in various embodiments, presents a visual depiction of the FFT breakdown of the input audio signal. This section can show multiple FFT bands and a volume threshold 815. As discussed earlier, the volume threshold, when used in tandem with the binaural processing algorithm, indicates the FFT bands that are suitable for selection as a binaural frequency pair. In FIG. 8, the waveform section 808 features five binaural frequencies 820, each corresponding to a user-selected brainwave frequency. In numerous embodiments, the system bolsters binaural frequencies by manipulating the gain of the filter and/or oscillator for the binaural frequency pair, which effectively enhances the gain of the frequency pair. The system continuously upholds the user's chosen binaural frequency in the output by strategically stressing and subsequently relieving the emphasis on previously highlighted frequency pairs, based on a set of binaural thresholds, such as the volume threshold 815. This ongoing adjustment enables simultaneous emphasis on multiple binaural frequencies within the audio signal.

Figure 5:
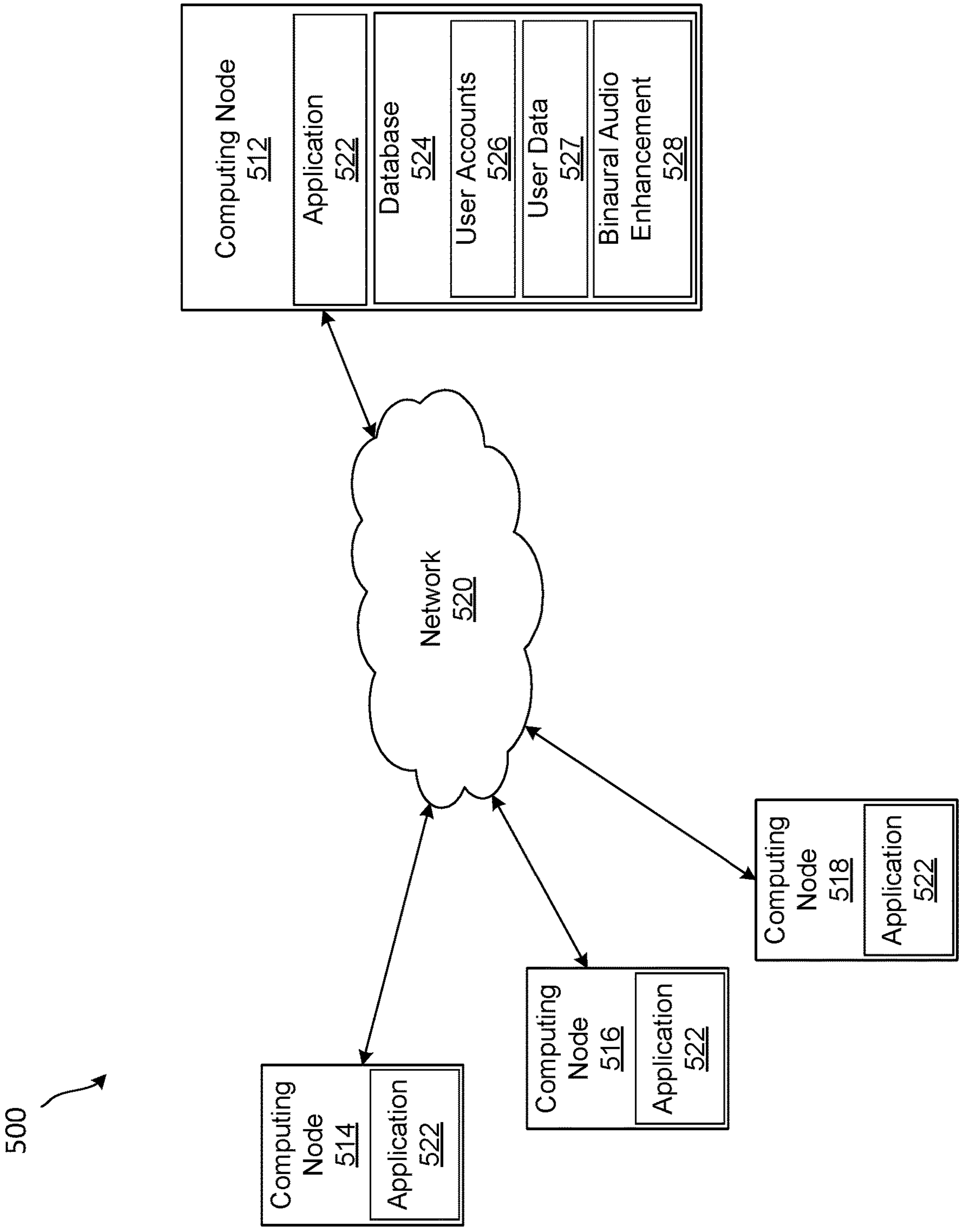
FIG. 5 depicts a network diagram of a plurality of computing nodes, according to one or more embodiments of the disclosure.
Figure 6:
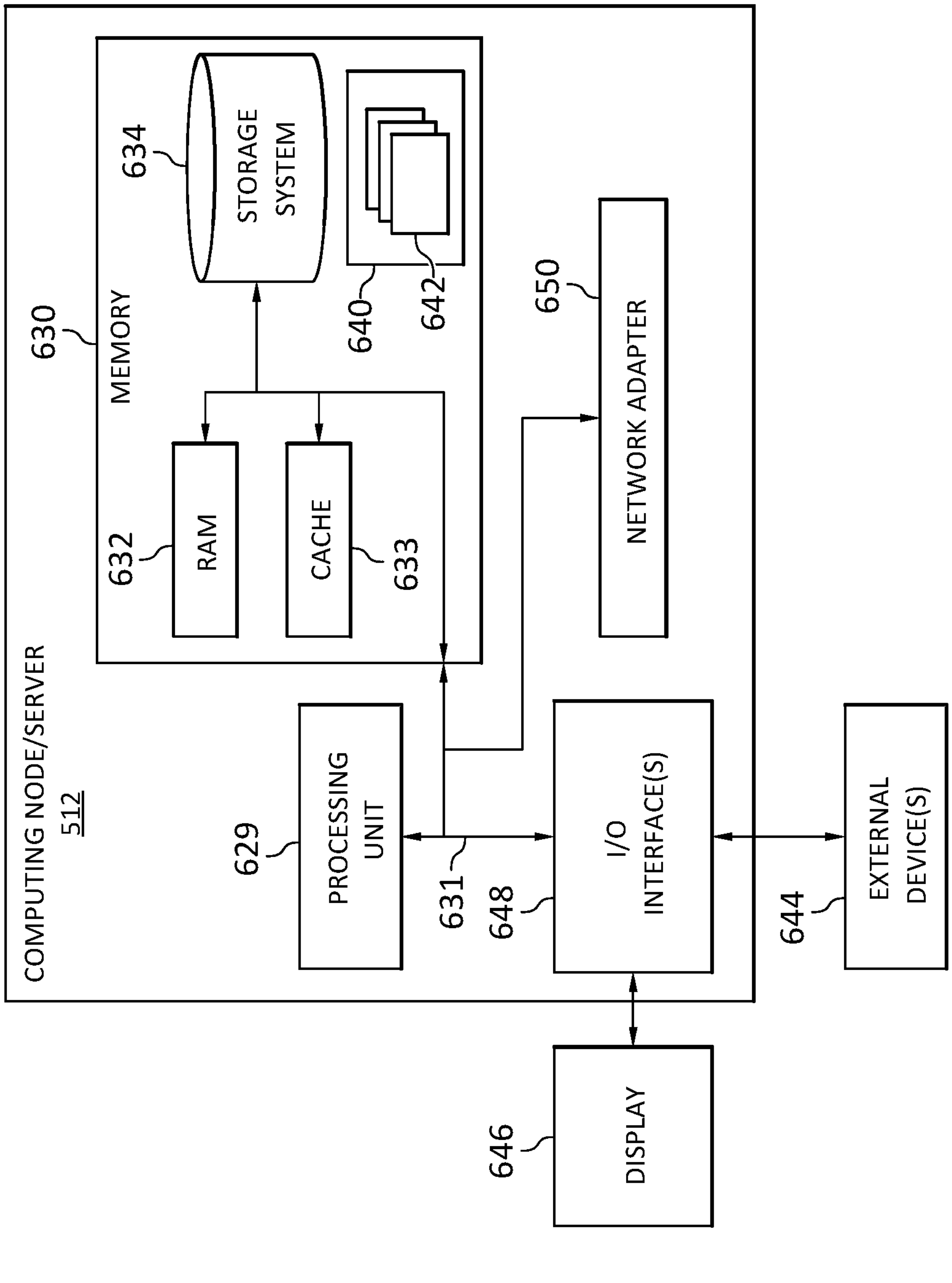
FIG. 6 depicts a general structure of a computing node, according to one or more embodiments of the disclosure.

Referring to FIGS. 5-6, a network diagram, and a computing node in a system 500 for real-time binaural audio is depicted, according to one or more embodiments. In one or more embodiments the system 500 includes one or more computing nodes 512-518. Computing nodes 512-518, may be physical devices, usable by a consumer or other user, including processing elements and memory. The computing nodes 512-518, include, for example, a desktop computer, laptop computer, tablet device, smart phones, wearable computing device, or other suitable device. Computing nodes 512-518, are interconnected via a network 520, for communication. In one or more embodiments, the network 520 may be, for example, a local area network, a wide area network, a cloud computing environment, a public network (e.g., the internet), or other suitable network for communication between the computing nodes 512-518.

In one or more embodiments, the system 500 outputs data and receives inputs to and from users via the computing nodes 512-518. For example, the computing nodes 512-518 may each include input/output devices, for example a display and/or touchscreen, for interfacing with a user via a graphical user interface (GUI) or other user interface. In one or more embodiments, each of the computing nodes 512-518 includes an application 522 ("App"). In some embodiments, the App 522 is a program or "software" that is stored in memory accessible by computing nodes 512-518 for execution on the computing nodes 512-518. In one or more embodiments App 522 includes a set of instructions for execution by processing elements on one or more of the computing nodes 512-518, for binaural audio enhancement, as described herein. In certain embodiments, App 522 is stored locally on some or all of the computing nodes 512-518. In some embodiments, App 522 is stored remotely, accessible to some or all of the computing nodes 512-518 via network.

In some embodiments, computing nodes 512-518 are arranged in a client server architecture. For example, computing node 512 may be configured as a server with computing nodes 514-518 arranged as clients. For example, depicted in FIG. 5, computing node 512 is a server including database 524, and computing nodes 514-518 are clients, who use App 522 to communicate with the server to establish user accounts 526, input user data 527. In certain embodiments, clients use App 522 for binaural audio enhancement

528. For example, in such embodiments the server performs audio enhancement according to embodiments described herein and streams or otherwise sends the enhanced output audio to the clients. In some embodiments, the computing nodes 512-518 are arranged in a peer-to-peer architecture, with computing nodes 512-518 acting as both client and server.

Referring now to FIG. 6, a block diagram of the computing node 512 is depicted, according to one or more embodiments of the disclosure. Computing node 512 is only one example of a suitable system and is not intended to suggest any limitation as to the scope of use or functionality of the embodiments described herein. Regardless, computing node 512 is capable of being implemented and/or performing any of the functionality set forth as described herein.

Computing node/server may be is operational with numerous other general purpose or special purpose computing system environments or configurations. Examples of well-known computing systems, environments, and/or configurations that may be suitable for use with computing node/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computing node/server 512 may be described in the general context of computer system, including executable instructions, such as program modules, being executed by a computer system. Generally, program modules may include routines, programs, objects, components, logic, data structures, and so on that perform particular tasks or implement particular abstract data types. Computing node/server 512 may be practiced in distributed computing environments where tasks are performed by remote processing devices that are linked through a network. In a distributed computing environment, program modules may be located in both local and remote computer system storage media including memory storage devices.

The components of computing node/server 512 may include, but are not limited to, one or more processors or processing units 629, a system memory 630, and a bus 631 that couples various system components including system memory 630 to processor 629.

Bus 631 represents one or more of any of several types of bus structures, including a memory bus or memory controller, a peripheral bus, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing node/server 512 typically includes a variety of computer readable media. Such media may be any available media that is accessible by computing node/server 512, and it includes both volatile and non-volatile media, removable and non-removable media. System memory 630 can include computer readable media in the form of volatile memory, such as random access memory (RAM) 632 and/or cache memory 633. Computing node/server 512 may further include other removable/non-removable, volatile/non-volatile computer storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 631 by one or more data media interfaces. As will be further depicted and described below, memory 630 may include at least one program product having a set (e.g., at least one) of program modules that are configured to carry out the functions of embodiments of the disclosure.

Program/utility 640, having a set (at least one) of program modules 642, may be stored in memory 630 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of one or more of the embodiments described herein.

Computing node/server 512 may also communicate with one or more external devices 644 such as a keyboard, a pointing device, speakers, headphones, a display 646, etc.; one or more devices that enable a user to interact with computing node/server 512; and/or any devices (e.g., network card, modem, etc.) that enable computing node/server 512 to communicate with one or more other computing devices. Such communication can occur via Input/Output (I/O) interfaces 648. Still yet, computing node/server 512 can communicate with one or more networks such as a local area network (LAN), a general wide area network (WAN), and/or a public network (e.g., the Internet) via network adapter 550. As depicted, network adapter 550 communicates with the other components of computing node/server 512 via bus 631. It should be understood that although not shown, other hardware and/or software components could be used in conjunction with computing node/server 512. Examples, include, but are not limited to microcode, device drivers, redundant processing units, external disk drive arrays, RAID systems, tape drives, and data archival storage systems, etc.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In one or more embodiments, the concepts and technologies disclosed herein can be represented by or embodied in the form of a transformer block within an artificial intelligence (AI) learning model or system. A transformer block, characterized by its self-attention mechanism and feed-forward neural networks, can capture the complex relationships and dynamics proposed in these embodiments. The AI learning model, equipped with this transformer block, can efficiently process input data, such as audio signals, and apply the High Q Peak filter approach and automatic carrier frequency determination methodologies as outlined in this disclosure. This embodiment, combining the strengths of transformer-based AI learning models with the innovative signal processing techniques discussed, can yield a robust and efficient system for audio analysis and brainwave frequency targeting, contributing to fields ranging from cognitive neuroscience to digital signal processing and beyond.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one or more embodiments, the principles described in this disclosure are broadly applicable across various types of waveforms, not limited to audio signals alone. For instance, these principles could be employed to manipulate light frequencies in certain embodiments. The objective would be to induce desired effects on the brain, much like the way binaural audio frequencies are utilized. This could involve the enhancement or suppression of certain light frequencies using optical filters, analogous to audio filters in signal processing. Optical filters can selectively allow or block specific wavelengths of light, thereby regulating the light frequency spectrum reaching the viewer's eyes. This opens up a myriad of applications in fields such as optogenetics, light therapy, and visual stimuli-based cognitive neuroscience, where tailored light frequency patterns could be used for various therapeutic or experimental purposes.

In one or more embodiments, the principles detailed in this disclosure can be extended to include 360 spatial audio positioning into the sound processing framework. This involves incorporating additional parameters that account for the directionality and spatial location of sound sources. Specifically, the audio processing equations would need to consider the position of the sound source relative to the listener's ears, and also take into account the listener's head position and orientation. This creates a more immersive and realistic auditory experience by accurately reproducing the spatial characteristics of sound in three dimensions. Such a system could simulate the auditory cues we naturally use to perceive sound direction and distance, including interaural time differences, interaural level differences, and spectral cues, among others. This would further enhance the effect of the binaural frequency manipulation by embedding it within a holistic, spatially accurate sound field.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An adaptive interaural amplitude modulation system comprising:
- an audio signal source;
- a digital signal processor including computer executable instructions configured to:
  - receive left and right-channel digital audio signals from the audio signal source;
  - determine real-time amplitude peaks within each channel to identify a plurality of narrowband spectral components corresponding to existing signal energy;
  - apply, in real time, adaptive amplitude modulation to at least one detected component based on real-time amplitude thresholds, thereby emphasizing pre-existing frequency content without performing frequency-domain resynthesis or generating new oscillators;
    - introduce between the left and right channels a user-selectable interaural offset (λ) corresponding to a modulation range within approximately 1 Hz to 100 Hz; and
  - output a stereo audio signal corresponding to the received digital audio signal and including adaptively modulated amplitude patterns.

2. The system of claim 1, wherein amplitude modulation produces differences between the left- and right-channel amplitude envelopes that are perceptible neurologically but inaudible to a human listener.

3. The system of claim 1, wherein detecting the spectral peaks includes filtering the incoming signal through two or more digital band-pass filters each having a high Q-factor and providing approximately 1 Hz frequency resolution.

4. The system of claim 1, wherein the digital signal processor continuously updates each filter's Q-factor and center frequency based on instantaneous amplitude feedback to maintain dynamic resonance stability.

5. The system of claim 1, wherein the interaural offset (λ) is selectable within approximately 1 Hz to 100 Hz to produce neural-frequency-range modulations without emitting audible tones.

6. The system of claim 1, wherein the adaptive amplitude modulation operates with substantially zero to no latency and preserves stereo alignment between channels without performing resynthesis.

7. The system of claim 1, wherein, the digital signal processor independently detects a plurality of spectral peaks within each stereo channel and applies separate adaptive amplitude modulations to the corresponding bands, producing asynchronous multi-band modulation patterns that vary independently between the left and right channels without generating additional tones or summed content.

8. The system of claim 1, the adaptive amplitude modulation operates independently within five or more spectral bands per channel, each band responding in real time to local amplitude peaks with near-instantaneous recovery that preserves zero-to-no-latency operation.

9. The system of claim 1, wherein emergent higher-frequency resonances arise solely from controlled amplitude-domain feedback acting on existing signal components, without explicit frequency injection or generation of new tones.

10. The system of claim 1, wherein
- the digital signal processor concurrently manages multiple band-specific amplitude-modulation events and applies per-band priority control to prevent clipping and preserve stereo alignment.

11. A method for adaptive real-time stereo amplitude-domain audio enhancement, the method comprising:
- receiving, at a digital signal processor, left- and right-channel digital audio signals;
- detecting instantaneous amplitude peaks within each channel to identify narrowband spectral components exceeding amplitude thresholds;
- separating each channel into a plurality of frequency bands including at least five per channel;
- monitoring amplitude within each band and comparing the amplitude to a dynamic threshold that varies with instantaneous input level;
- when the threshold is exceeded, applying micro-amplitude modulation within that band in real time at a modulation rate of about 1 Hz or faster, with zero or effectively zero latency;
- introducing a controllable interaural amplitude offset between the left and right channels corresponding to a selected modulation-frequency range of approximately 1 Hz to 100 Hz;
- introducing controlled resonant feedback within one or more bands so that equalization continuously evolves in response to interaction with the live audio signal; and
- outputting the same stereo audio signal enhanced only through amplitude-domain modulation of existing frequency components, without mixing, summing to mono, resynthesizing, or generating new content.

12. The method of claim 11, wherein detecting narrowband peaks includes using two or more digital band-pass filters each having a high Q-factor providing approximately 1 Hz resolution to isolate distinct narrowband signal components.

13. The method of claim 11, wherein applying micro-amplitude modulation includes dynamically adjusting filter amplitude based on instantaneous energy feedback, producing continuously varying, non-repeating spectral motion.

14. The method of claim 11, wherein the modulation produces continuously evolving, non-repeating amplitude behavior that arises inherently from adaptive updates of amplitude and Q-factor parameters in response to the live input content.

15. The method of claim 11, wherein amplitude-modulation parameters are updated at a rate greater than 100 times per second to maintain perceptual continuity and prevent latency accumulation.

16. The method of claim 11, further comprising maintaining stereo localization by preserving interaural level and time differences in the output signal while avoiding any mono summation.

17. The method of claim 11, wherein feedback-driven amplitude interactions among the adaptive bands produce a bounded, continuously shifting modulation pattern, and wherein modulation within each band is limited to positive amplitude adjustment relative to a source signal.

18. The method of claim 11, emergent high-frequency resonance arises solely from interaction of amplitude-domain equalization and controlled resonant feedback, without explicit frequency injection.

19. The method of claim 11, wherein multiple adaptive filter bands operate concurrently, each applying independent real-time amplitude modulation based on its own instantaneous energy feedback, thereby producing a composite stereo output containing distinct, continuously evolving modulation nodes without generating additional signals or mixed sub-streams.

20. A non-transitory computer readable medium storing instructions executable by a processor for real-time stereo adaptive amplitude modulation, the instructions, when executed, performing a method comprising: receiving left- and right-channel digital audio signals; detecting a plurality of narrowband spectral components exceeding adaptive thresholds; applying adaptive amplitude modulation to at least one detected component in real time without performing resynthesis or oscillator generation; and outputting a stereo signal corresponding to the received audio and including the adaptively modulated amplitude pattern.

* * * * *